US011852157B2

(12) United States Patent
Suzuki et al.

(10) Patent No.: US 11,852,157 B2
(45) Date of Patent: Dec. 26, 2023

(54) BLOWER

(71) Applicant: YAMABIKO CORPORATION, Tokyo (JP)

(72) Inventors: Kenji Suzuki, Ohme (JP); Satsuki Yuzuki, Ohme (JP)

(73) Assignee: YAMABIKO CORPORATION

( * ) Notice: Subject to any disclaimer, the term of this patent is extended or adjusted under 35 U.S.C. 154(b) by 0 days.

(21) Appl. No.: 18/153,445

(22) Filed: Jan. 12, 2023

(65) Prior Publication Data

US 2023/0235747 A1 Jul. 27, 2023

(30) Foreign Application Priority Data

Jan. 27, 2022 (JP) .................. 2022-011252

(51) Int. Cl.
*F04D 29/28* (2006.01)
*A01G 20/47* (2018.01)
(52) U.S. Cl.
CPC ........... *F04D 29/281* (2013.01); *A01G 20/47* (2018.02)
(58) Field of Classification Search
CPC ............................. F04D 29/281; A01G 20/47
See application file for complete search history.

(56) References Cited

U.S. PATENT DOCUMENTS

| 6,514,036 B2* | 2/2003 | Marshall | F04D 29/281 |
| | | | 415/206 |
| 7,735,188 B2* | 6/2010 | Shaffer | E01H 1/0809 |
| | | | 15/344 |
| 9,538,711 B2 | 1/2017 | Mutoh et al. | |
| 10,132,328 B2* | 11/2018 | Cho | F04D 29/441 |
| 2002/0106289 A1 | 8/2002 | Tanaka et al. | |
| 2014/0072434 A1 | 3/2014 | Wu | |

FOREIGN PATENT DOCUMENTS

| DE | 202021001609 U1 | 7/2021 |
| JP | 2001-140800 A | 5/2001 |
| KR | 20050009312 A | 1/2005 |
| TW | 201831790 A | 9/2018 |

OTHER PUBLICATIONS

European Search Report issued in the European Patent Application No. 23150844,1; dated Jun. 19, 2023 (total 6 pages).

* cited by examiner

*Primary Examiner* — Sabbir Hasan
(74) *Attorney, Agent, or Firm* — Harness, Dickey & Pierce, P.L.C.

(57) ABSTRACT

The present invention provides a blower with reduced noise. The blower comprises a blower main body incorporating a centrifugal fan. The blower main body is configured to suck air from both sides of the blower main body by rotation of the centrifugal fan. The centrifugal fan includes a support plate having a rotation center and a plurality of blades provided on each of a first surface and a second surface of the support plate. A position of at least part of the plurality of blades on the first surface and a position of at least part of the plurality of blades on the second surface are misaligned in a circumferential direction, and/or a number of the plurality of blades on the first surface differs from a number of the plurality of blades on the second surface.

20 Claims, 9 Drawing Sheets

FRONT ←→ REAR

FIG. 9

BLOWER

CROSS REFERENCE TO RELATED APPLICATIONS

The present application claims priority under 35 U.S.C. § 119 to Japanese Patent Application No. 2022-11252, filed Jan. 27, 2022, the contents of which are incorporated herein by reference in their entirety.

BACKGROUND

Technical Field

The present invention relates to a blower.

Related Art

Conventionally, an engine blower is known in which air is drawn in from two side surfaces of a blower case by rotation of a blower fan and ejected from an outlet on an outer peripheral surface of the blower case (see JP2001-140800A). The blower fan comprises blower blades on both surfaces thereof.

However, a blower that drives a fan with an electric motor is often used in the world since it is much quieter than a blower that drives a fan with an internal combustion engine. Although a blower based on such an electric motor can be used regardless of location and time, there is still a demand for a quieter blower. In view of the above circumstances, the present invention provides a blower with reduced noise.

According to an aspect of the invention, a blower is provided. The blower comprises a blower main body incorporating a centrifugal fan. The blower main body is configured to suck air from both sides of the blower main body by rotation of the centrifugal fan. The centrifugal fan includes a support plate having a rotation center and a plurality of blades provided on each of a first surface and a second surface of the support plate. A position of at least part of the plurality of blades on the first surface and a position of at least part of the plurality of blades on the second surface are misaligned in a circumferential direction, and/or a number of the plurality of blades on the first surface differs from a number of the plurality of blades on the second surface.

According to such an aspect, it is possible to provide a blower with reduced noise while maintaining a high jetting force of air.

DETAILED DESCRIPTION

Hereinafter, embodiments of the present invention will be described with reference to drawings. Various features described in the embodiment below can be combined with each other.

A program for realizing software in the present embodiment may be provided as a non-transitory computer-readable medium that can be read by a computer or may be provided for download from an external server or may be provided so that the program can be activated on an external computer to realize functions thereof on a client terminal (so-called cloud computing).

In the present embodiment, "portion" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of circuit, circuitry, processor, memory, or the like. In other words, it is a circuit that includes an application specific integrated circuit (ASIC), a programmable logic device (e.g., a simple programmable logic device (SPLD), a complex programmable logic device (CPLD), a field programmable gate array (FPGA)), or the like.

Figure 1:
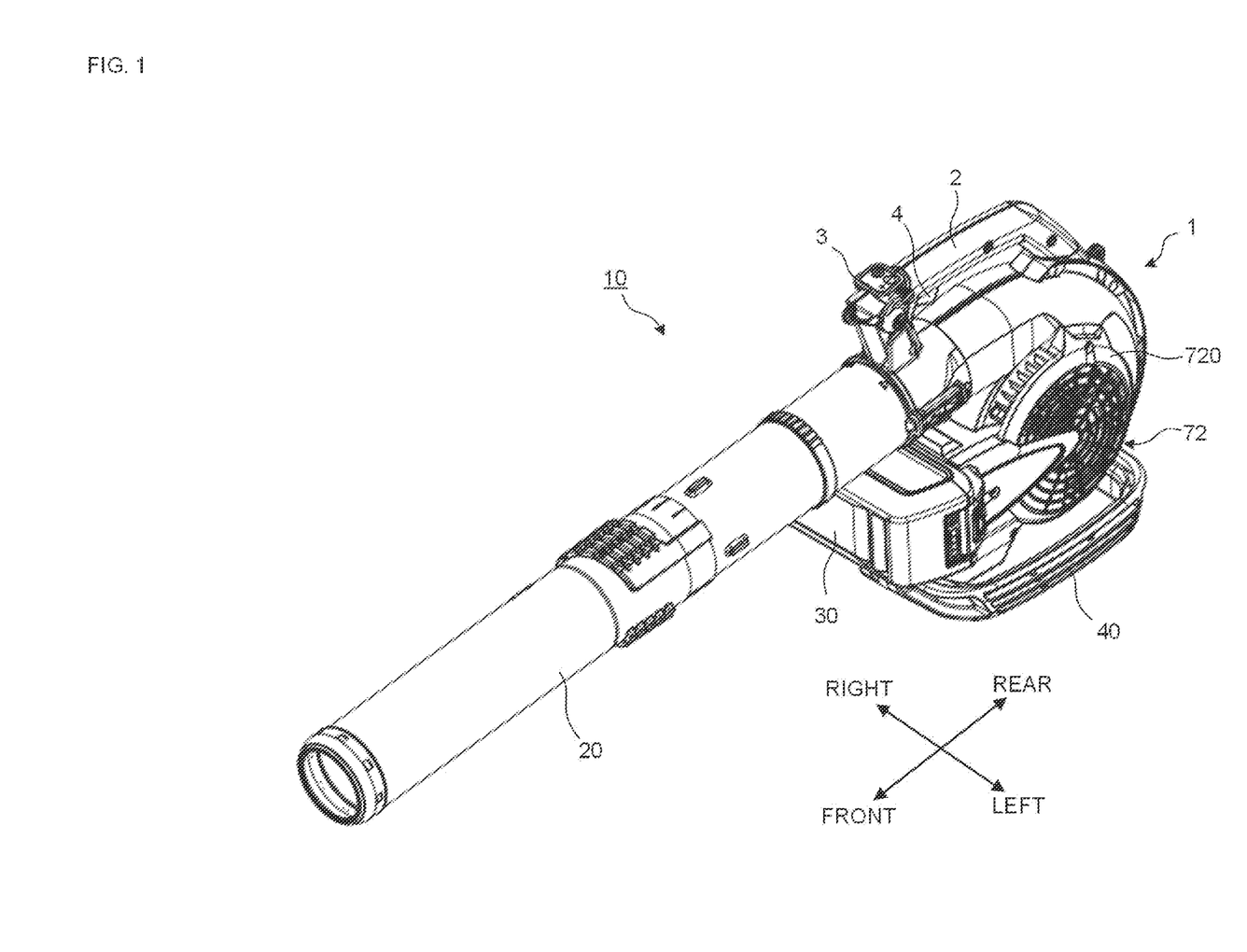
FIG. 1 is a perspective view of a blower viewed from an upper side.
Figure 2:
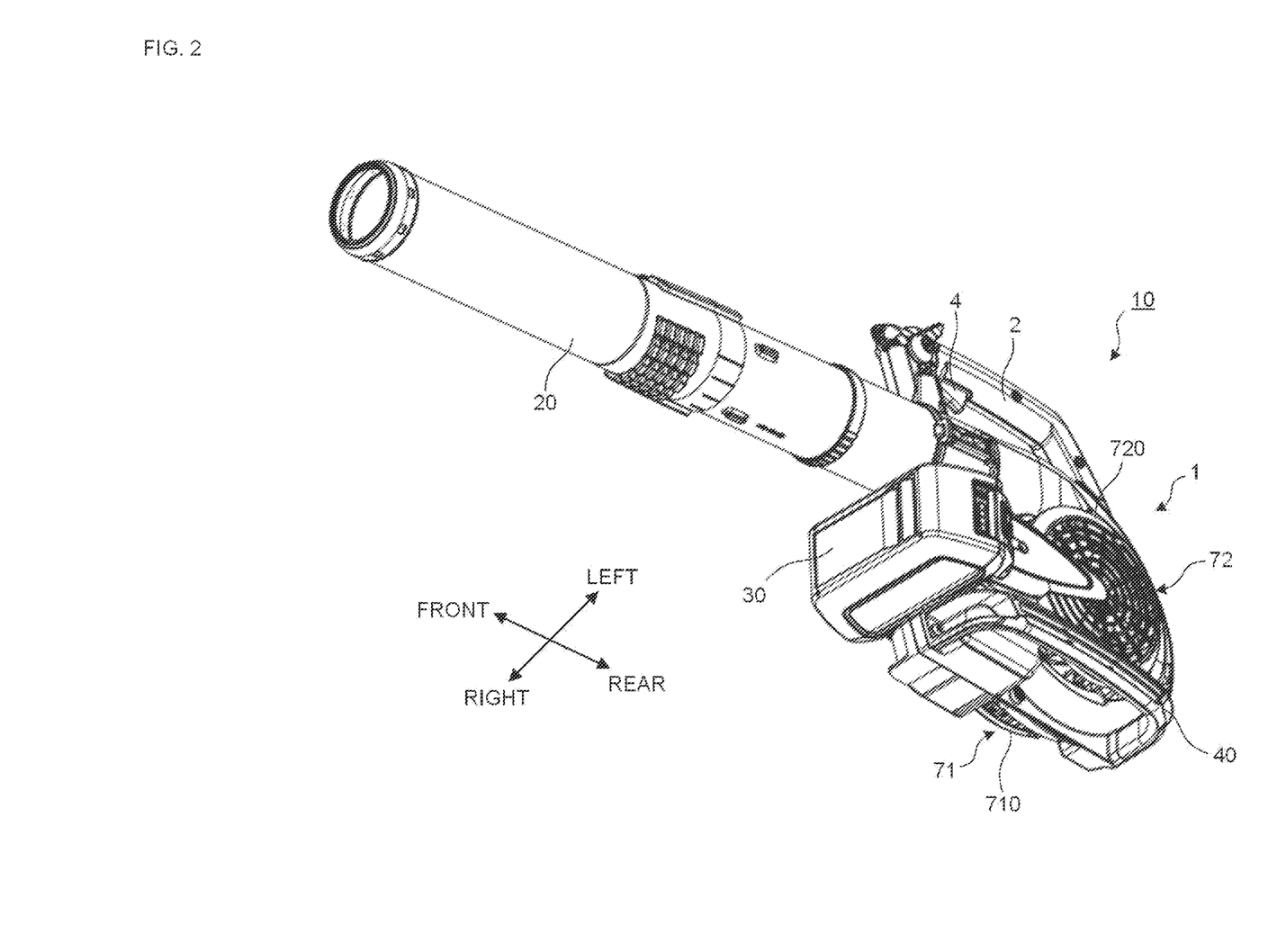
FIG. 2 is a perspective view of the blower viewed from a lower side.
Figure 3:
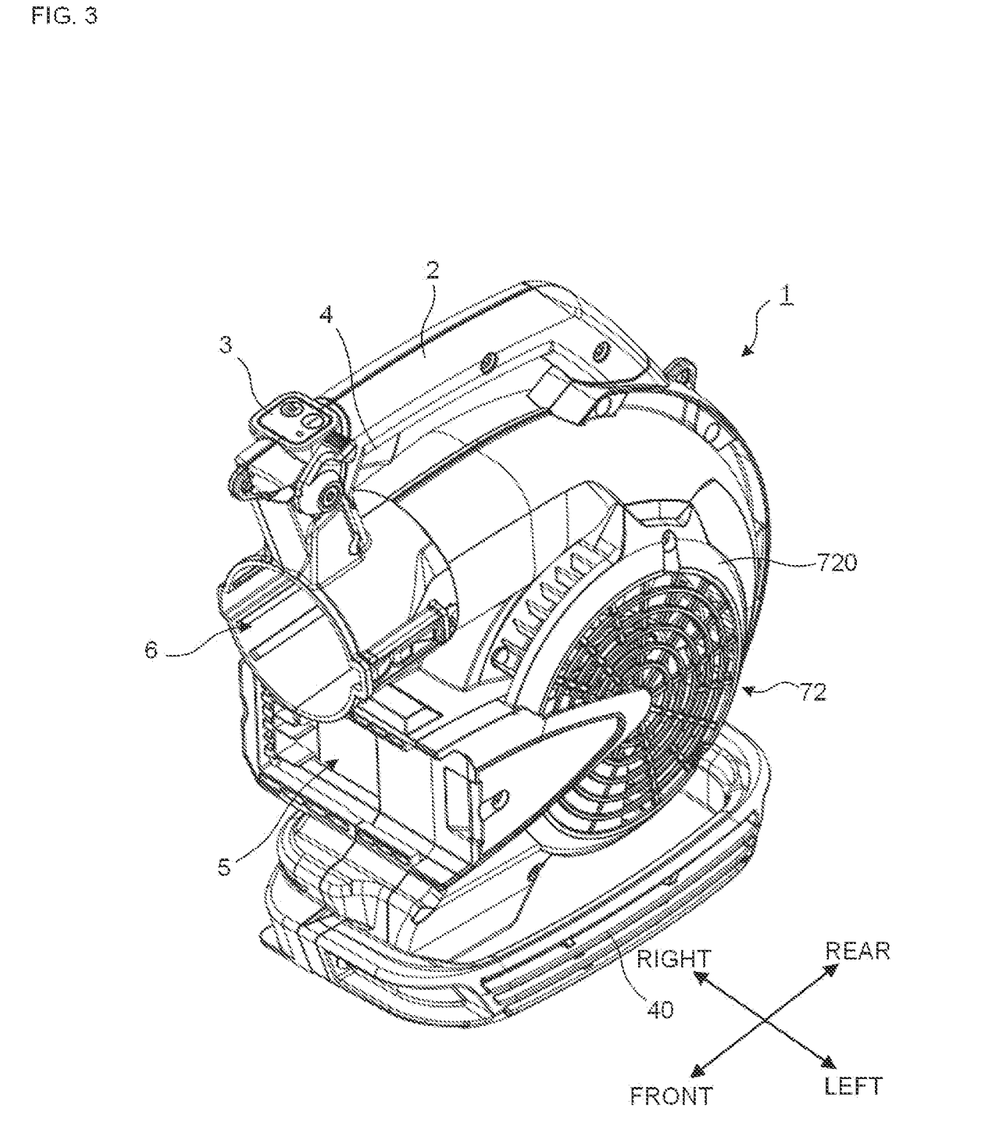
FIG. 3 is a perspective view of a blower main body.
Figure 4A:
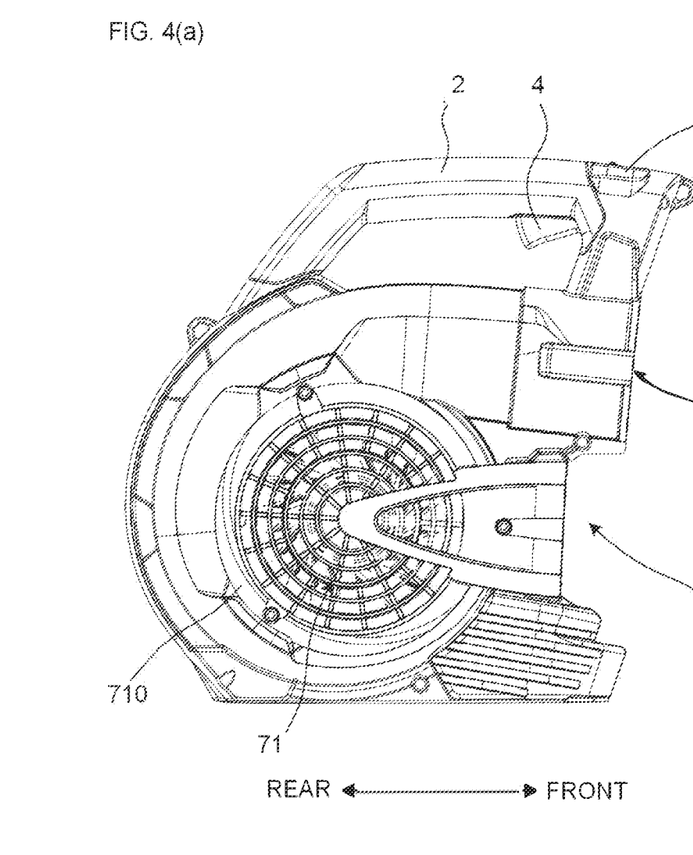
FIG. 4(a) is a right side view of the blower main body and FIG. 4(b) is a left side view of the blower main body.
Figure 4B:
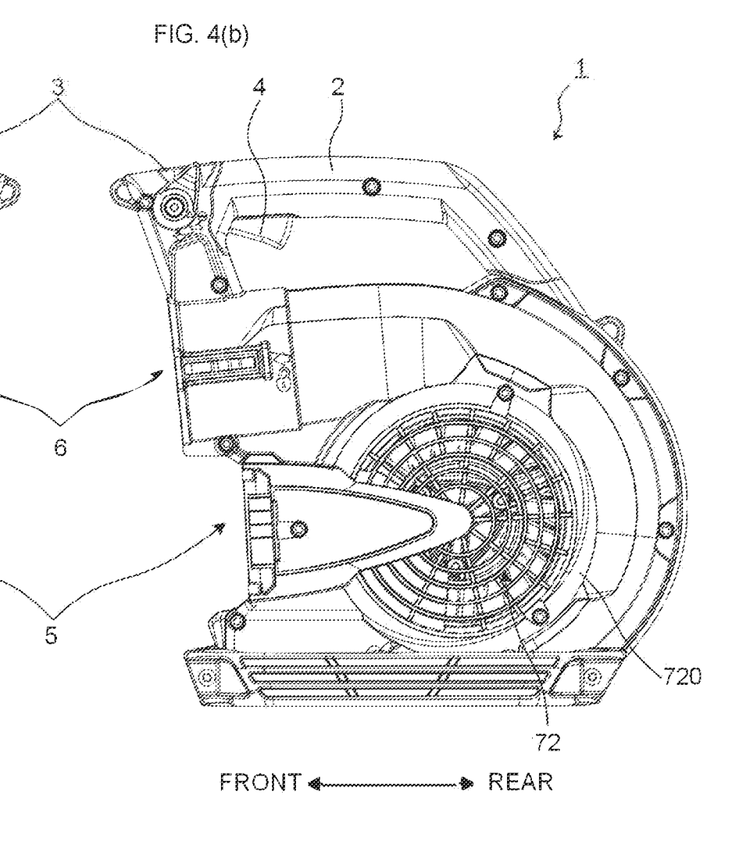
Figure 5:
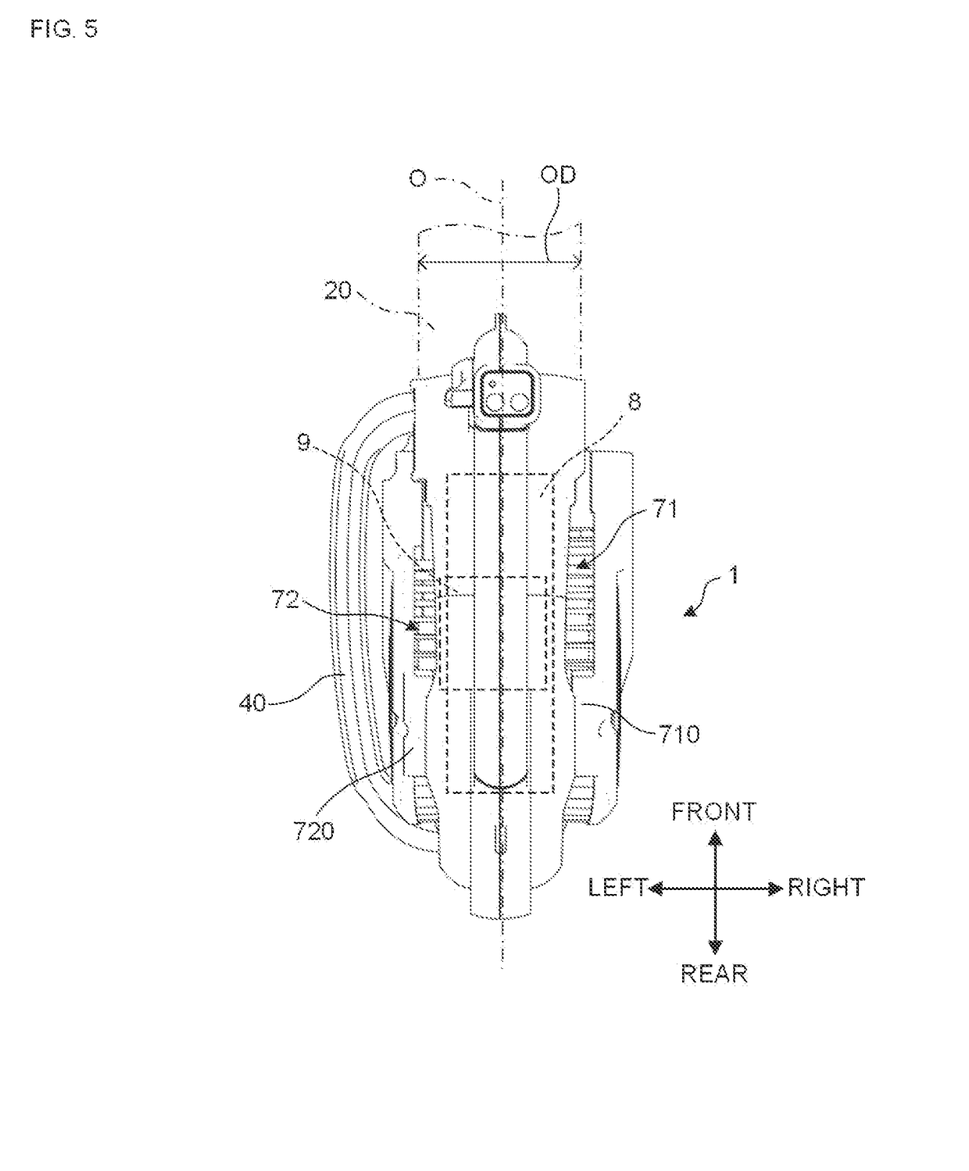
FIG. 5 is a plan view of the blower main body.
Figure 6:
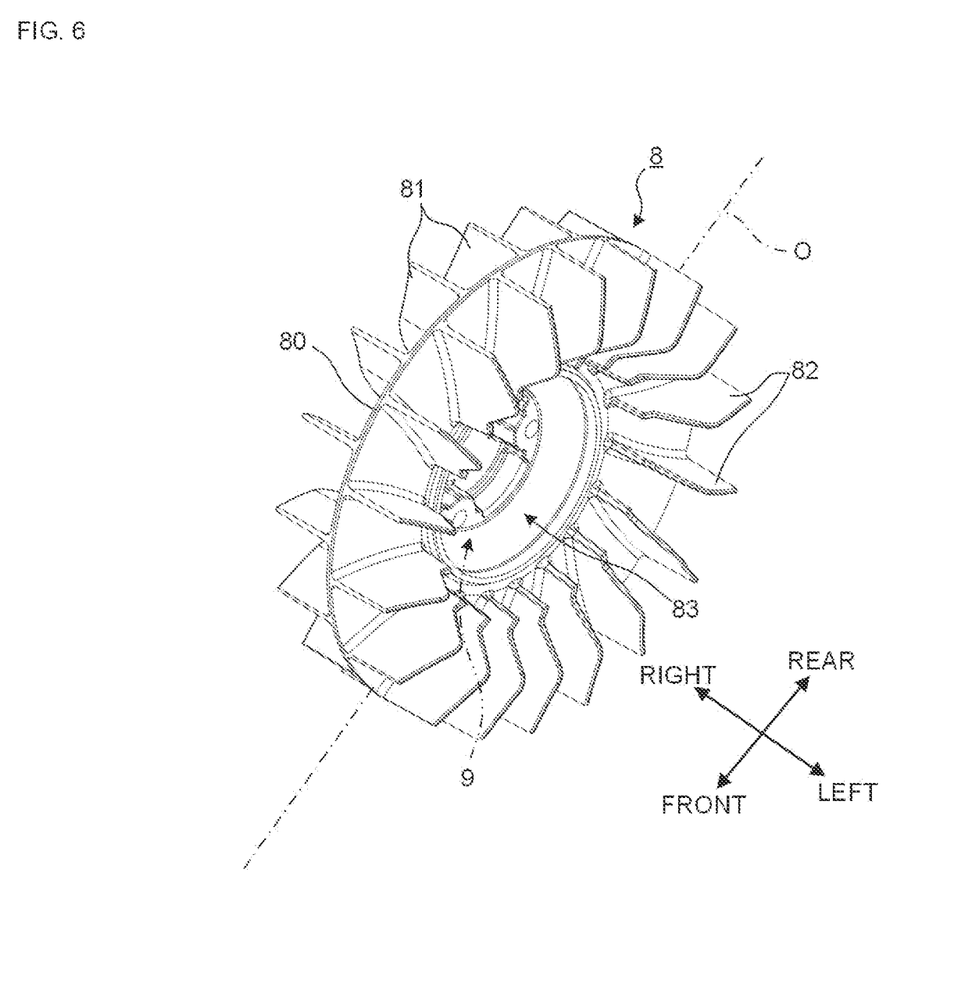
FIG. 6 is a perspective view of a centrifugal fan.
Figure 7:
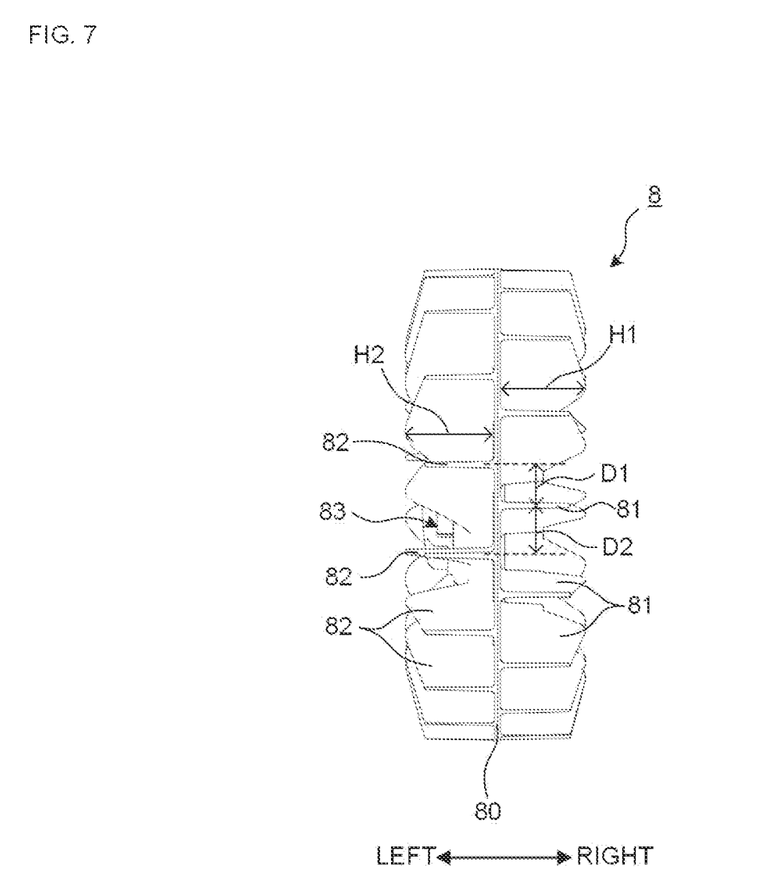
FIG. 7 is a rear view of the centrifugal fan.
Figure 8:
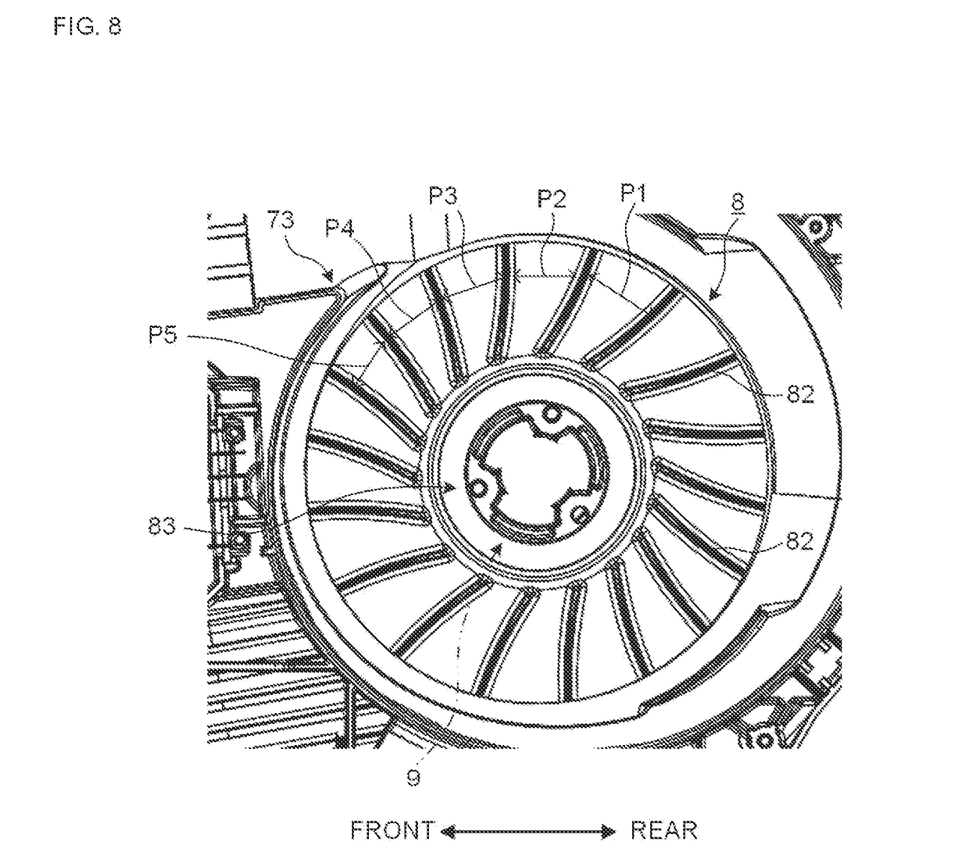
FIG. 8 is a left side view of the centrifugal fan.

FIG. 1 is a perspective view of a blower viewed from an upper side. FIG. 2 is a perspective view of the blower viewed from a lower side. FIG. 3 is a perspective view of a blower main body. FIG. 4(a) is a right side view of the blower main body and FIG. 4(b) is a left side view of the blower main body. FIG. 5 is a plan view of the blower main body. FIG. 6 is a perspective view of a centrifugal fan. FIG. 7 is a rear view of the centrifugal fan. FIG. 8 is a left side view of the centrifugal fan.

The blower according to the present invention is an apparatus that blows an air stream and is used, for instance, to blow away fallen leave, garbage, pebble, etc.

The blower 10 shown in FIG. 1, etc. comprises a blower main body 1 and a blower pipe 20 that is attached to (fixed to) the blower main body 1.

In the following description, when viewing the blower main body 1 in the drawings, a side to which the blower pipe 20 is mounted is defined as "front side" or "tip side", and a side opposite to the side where the blower pipe 20 is mounted is defined as "rear side" or "base end side". In addition, when viewing the blower main body 1 from an upper side and a rear side in the drawings, a right side is defined as "right" or "right side", and a left side is defined as "left" or "left side".

The blower pipe 20 is configured of a cylindrical member, and as shown in FIG. 3, a base end portion of the blower pipe 20 is inserted and fitted into an attachment portion 6 of the blower main body 1 to allow the blower pipe 20 to be detachable from the blower main body 1. Please note that the blower pipe 20 may or may not be flexible.

The blower main body 1 is provided with a battery mounting portion 5 on its front surface, and a battery 30 is attached to the battery mounting portion 5. The battery 30 supplies electric power necessary for driving a motor 9, which will be described later.

Further, a handle 2 to be gripped by an operator or the like is provided on an upper portion of the blower main body 1, and a power switch portion 3 for turning on/off power supply to the blower main body 1 is provided on a tip side of the handle 2.

Furthermore, a frame-shaped support portion 40 is mounted to a lower left side of the blower main body 1. When viewing the blower main body 1 from an upper side, the support portion 40 protrudes outward beyond a fan cover 710 and a fan cover 720 in a horizontal direction.

This allows the operator to grip the handle 2 and the support portion 40 to support the blower with both hands, in such a manner that a posture of the blower 10 can be stably maintained. Furthermore, since the support portion 40 protrudes outward beyond the fan cover 710 and the fan cover 720, it is possible to prevent a ventilation portion 72 from being blocked by clothes of the operator or the like when the support portion 40 is gripped. In addition, even if the blower 10 is placed on ground or a mounting table, the support portion 40 and a bottom surface of the blower 10 are in contact with the ground or the mounting table in such a manner that a horizontal state of the blower 10 can be maintained. Furthermore, when the blower main body 1 is dropped, damage to the blower main body 1 can be reduced when the support portion 40 collides with the ground first.

Further, an operation portion (trigger) 4 for controlling driving of the motor 9 (controlling rotation velocity, etc.) is provided at a lower portion of the handle 2 on the tip side. For instance, rotation velocity of the motor 9 or the like can be adjusted according to a degree to which the operation portion 4 is pushed to an upper side (handle 2 side).

A pair (two) of ventilation portions, which are a ventilation portion 71 and the ventilation portion 72, are provided on both left side surface and right side surface of the blower main body 1. Air drawn into the blower main body 1 via the ventilation portion 71 and the ventilation portion 72 is ejected from a tip side portion of the blower pipe 20 as an airflow.

The blower main body 1 incorporates a centrifugal fan 8 at a position corresponding to the two ventilation portions that are the ventilation portion 71 and the ventilation portion 72. The present invention is characterized by a configuration of the centrifugal fan 8.

As shown in FIG. 6, the centrifugal fan 8 comprises a disk-shaped support plate 80 including a rotation center, and a plurality of blades 81 and a plurality of blades 82 provided on each of a right side surface (first surface) and a left side surface (second surface) of the support plate 80. Each of the blade 81 and the blade 82 is configured of a plate piece that curves toward the rotation center.

A recess 83 is formed in a center of the centrifugal fan 8, and the motor 9 is stored and fixed in the recess 83. In other words, the motor 9 is fixed to the centrifugal fan 8 so as to be positioned inside the centrifugal fan 8.

The centrifugal fan 8 is rotatably supported with respect to a case of the blower main body 1 via a rotational central axis of the motor 9 in such a manner that the plurality of blades 81 faces the ventilation portion 71 and the plurality of blades 82 faces the ventilation portion 72.

With such a configuration, the blower main body 1 is configured to suck air from both side surfaces (the ventilation portion 71 and the ventilation portion 72) by rotation of the centrifugal fan 8.

However, the present inventor has found that noise generated by the rotation of the centrifugal fan 8 increases depending on a number of the blades 81 and the blades 82 positioned on both sides of the support plate 80, an arrangement position, or the like.

Therefore, in the present invention, as for position of at least some of the plurality of blades 81 and position of at least some of the plurality of blades 82, when viewing the centrifugal fan 8 from the right side surface (the first surface) of the support plate 80 or the left side surface (the second surface) of the support plate 80, their joints (boundaries) with the support plate 80 are offset in a circumferential direction so as not to overlap (misalign). In the present embodiment, the number of blades 81 and the number of blades 82 are the same, and positions of all blades 81 and blades 82 are misaligned in the circumferential direction. As a result, a peak phase of noise generated by the blade 81 and a peak phase of noise generated by the blade 82 can be shifted.

Here, noise generated by the entire centrifugal fan 8 is a combination of noise generated by the blade 81 and noise generated by the blade 82. However, by shifting the peak phase of noise generated by the blade 81 and the peak phase of noise generated by the blade 82, an increase in magnitude (sound pressure) of the noise peak can be prevented or suppressed. As a result, for the blower 10, noise can be reduced while maintaining a high blowing force of air.

In the present embodiment, one blade 81 provided on the right side surface (the first surface) of the support plate 80 is positioned at a center between adjacent blades 82 provided on the left side surface (the second surface) of the support plate 80. That is, as shown in FIG. 7, a separation distance D1 between the blade 81 and the adjacent blade 82 and a separation distance D2 between the blade 81 and the other adjacent blade 82 are set to be substantially equal. Such a configuration allows the peak phases of noise generated by the blade 81 and the blade 82 to be shifted more reliably, thereby noise of the entire centrifugal fan 8 can be more easily reduced.

In addition, by configuring each of the blades 81 and each of the blades 82 with a plate piece that curves toward the rotation center, a surface area thereof is increased and suction force of the centrifugal fan 8 is enhanced.

As shown in FIG. 8, a distance (pitch) between adjacent blades 82 (81) gradually decreases along the circumferential direction in an order of P1, P2, P3, P4, and P5, then gradually increases, gradually decreases again, and then gradually increases. That is, the plurality of blades 82 (81) have uneven pitches.

As shown in FIG. 8, pressure fluctuation is generated when the blades 82 (81) pass through a case tongue 73 of the blower main body 1, which is one of factors that generate noise. When the blades 82 (81) are of equal pitch, intervals of pressure fluctuation are the same, thus loud noise is likely to be generated at a specific frequency. In contrast, by making the blades 82 (81) unequal in pitch, intervals of pressure fluctuation are different for each blade 82 (81), thus frequency of generated noise can be dispersed, and magnitude of noise peak (sound pressure) can be further reduced.

A maximum height of each blade 81 is set approximately equal to a maximum height of each blade 82. With such a configuration, an amount of air drawn from the ventilation portion 71 can be brought close to an amount of air drawn from the ventilation portion 72. From this perspective as well, noise can be easily reduced.

Such a centrifugal fan 8 is preferably an integrated product (integrally molded product) of the support plate 80, the plurality of blades 81, and the plurality of blades 82. In this case, mechanical strength of the centrifugal fan 8 can be increased while weight thereof can be reduced. Configuration material of the centrifugal fan 8 includes, for example, a resin material such as polyolefin, polyamide, polyphenylene sulfide, or polycarbonate, a metal material such as aluminum or alloy thereof, or the like.

The blower pipe 20 is fixed to the blower main body 1 so as to extend in a direction perpendicular to the rotation center of the support plate 80 of the centrifugal fan 8 (tip direction). The support plate 80 of the centrifugal fan 8 is positioned on a central axis O of the blower pipe 20.

Further, when the blower main body 1 is viewed from an opposite side (rear side) of the blower pipe 20, the handle 2 and the motor 9 are configured to be positioned inside a range corresponding to an outer diameter OD of the blower pipe 20 as shown in FIG. 5.

The above configuration allows a gravity center of the blower main body 1 to be positioned closer to the central axis O of the blower pipe 20, thereby reducing variation in mass and amount of air suction on left and right sides of the blower main body 1 and improving operability of the blower 10.

The ventilation portion 71 and the ventilation portion 72 are formed through the fan cover 710 and the fan cover 720 provided on both left and right sides of the blower main body 1. Opening areas of the ventilation portion 71 and the ventilation portion 72 are set to be approximately equal. As a result, variation in the amount of air suction on the left and right sides of the blower main body 1 can be further reduced. Specifically, when the opening area of the ventilation portion 71 is S1 [cm$^2$] and the opening area of the ventilation portion 72 is S2 [cm$^2$], S2/S1 is not particularly limited, but is preferably about 0.75 to 1.3, more preferably about 0.8 and 1.2, and even more preferably about 0.9 to 1.1.

In the present embodiment, to make the opening areas approximately equal, the two ventilation portions, that are the ventilation portion 71 and the ventilation portion 72 (the fan cover 710 and the fan cover 720), are configured to have approximately equal shapes. In this case, it is possible to reduce influence of the shapes of the ventilation portion 71 and the ventilation portion 72 to reduce the variation in the amount of air suction on the left and right sides of the blower main body 1. Further, it is possible to prevent deterioration of design of the blower main body 1 (the blower 10).

The blower main body 1 incorporates a control board (not shown) for controlling operation of the motor 9. The control board is mounted with an arithmetic element and a storage element.

The arithmetic element is configured of, for instance, a CPU (Central Processing Unit), an MPU (Micro Processing Unit), or the like. The arithmetic element reads a predetermined program stored in the storage element to realize various functions related to the blower main body 1. In other words, information processing by software stored in the storage element is specifically realized by the arithmetic element.

Note that the arithmetic element is not limited to a single one, and a plurality of arithmetic elements may be provided for each function. A combination thereof may be applied as well.

The storage element stores various information as defined by the foregoing description. This may be implemented by, for instance, an SSD (Solid State Drive) that stores various programs or the like related to the blower main body 1 that is executed by the arithmetic element, or a memory such as a RAM (Random Access RAM) that store temporarily necessary information (argument, array, etc.) related to program operation.

In addition, the storage element stores various programs, variables, etc. related to the blower main body 1 executed by the arithmetic element.

According to the blower 10 of the above embodiment, since the centrifugal fan 8 has a characteristic configuration, it is possible to reduce noise while maintaining a high blowing force of air.

Further, if an arrangement of each portion is set in such a manner that the gravity center of the blower main body 1 is positioned close to the central axis O of the blower pipe 20, the variation of the mass or amount of air suction on the left and right sides of the blower main body 1 can be reduced, and operability of the blower 10 can be improved.

Furthermore, the present invention may be provided with each of the following aspects.

The blower, wherein: one of the blades on the first surface is positioned in a center between adjacent blades on the second surface.

The blower, wherein: the centrifugal fan includes a location where a distance between the adjacent blades differs in a circumferential direction on at least one of the first surface and the second surface.

The blower, wherein: the distance between the adjacent blades is progressively decreasing and/or increasing along a circumferential direction.

The blower, wherein: a maximum height of the blade on the first surface is approximately equal to a maximum height of the blade on the second surface.

The blower, wherein: the centrifugal fan is an integral object of the support plate and the plurality of blades.

The blower, further comprising: a blower pipe fixed to the blower main body so as to extend in a direction orthogonal to the rotation center of the support plate, wherein the support plate is positioned on a central axis of the blower pipe.

The blower, further comprising: a handle and a motor positioned inside a range corresponding to an outer diameter of the blower pipe when the blower main body is viewed from an opposite side of the blower pipe.

The blower, wherein: the motor is fixed to the centrifugal fan so as to be positioned inside the centrifugal fan.

The blower, wherein: the blower main body includes two ventilation portions arranged on both sides of the blower main body at positions corresponding to the centrifugal fan, and opening areas of the two ventilation portions are approximately equal.

The blower, wherein: the two ventilation portions have shapes that are substantially equal to each other.

Of course, the above aspects are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

For instance, as for position of only some of the plurality of blades 81 and position of only some of the plurality of blades 82, when viewing the centrifugal fan 8 from the right side surface (the first surface) of the support plate 80 or the left side surface (the second surface) of the support plate 80, their joints (boundaries) with the support plate 80 are offset in the circumferential direction in such a manner that the blade 81 and the blade 82 do not overlap (misalign). With such a configuration, the peak phase of noise generated by the blade 81 and the peak phase of noise generated by the blades 82 may be shifted. By making the number of the blades 81 and the number of the blades 82 to be different, the peak phase of noise generated by the blade 81 and the peak phase of noise generated by the blade 82 may be shifted. Furthermore, a combination thereof may be applied as well.

Moreover, from a perspective of dispersing frequency of generated noise, it is sufficient that there are locations where distances between the adjacent blade 81 and blade 82 are different in the circumferential direction, and there is no need to change over the entire circumferential direction and may be changed only at an arbitrary part of the location. That is, the distance between the adjacent blade 81 and blade 82 may gradually decrease or increase at some location and be constant at other location. Moreover, even when the distance between the adjacent blade 81 and blade 82 changes, there is no need to be continuous, and may be stepwise.

Furthermore, the two ventilation portions that are the ventilation portion 71 and the ventilation portion 72 may have different shapes from each other, as long as their opening areas are set to be substantially equal.

Further, the support portion 40 may be provided on a lower right side of the blower main body 1 instead of on a lower left side of the blower main body 1, or may be provided on the lower left side of the blower main body 1 and the lower right side of the blower main body 1. As a result, the blower 10 can be strongly gripped regardless of a dominant hand of the operator.

Embodiment

Hereinafter, the present invention will be described in more detail with reference to an embodiment and a comparative example, but the present invention is not limited thereto.

Embodiment

Polyamide is used to produce a centrifugal fan shown in FIG. 6.

In the centrifugal fan, a plurality of blades on both side surfaces are of unequal pitch, and the blade on a right side surface and the blade on a left side surface are all misaligned in a circumferential direction.

The manufactured centrifugal fan is then used to assemble a blower shown in FIG. 1, etc.

Comparative Example

Polyamide is used to produce a centrifugal fan in which positions of blades on both sides of a support plate are all coincident.

In the centrifugal fan, a plurality of blades on both side surfaces are of equal pitch, and the blade on a right side surface and the blade on a left side surface are all coincident (i.e., not misaligned) in a circumferential direction.

The manufactured centrifugal fan is then used to assemble a blower shown in FIG. 1, etc.

Next, the blowers in the embodiment and the comparative example are operated under same conditions, and noise generated at this time is measured.

Figure 9:
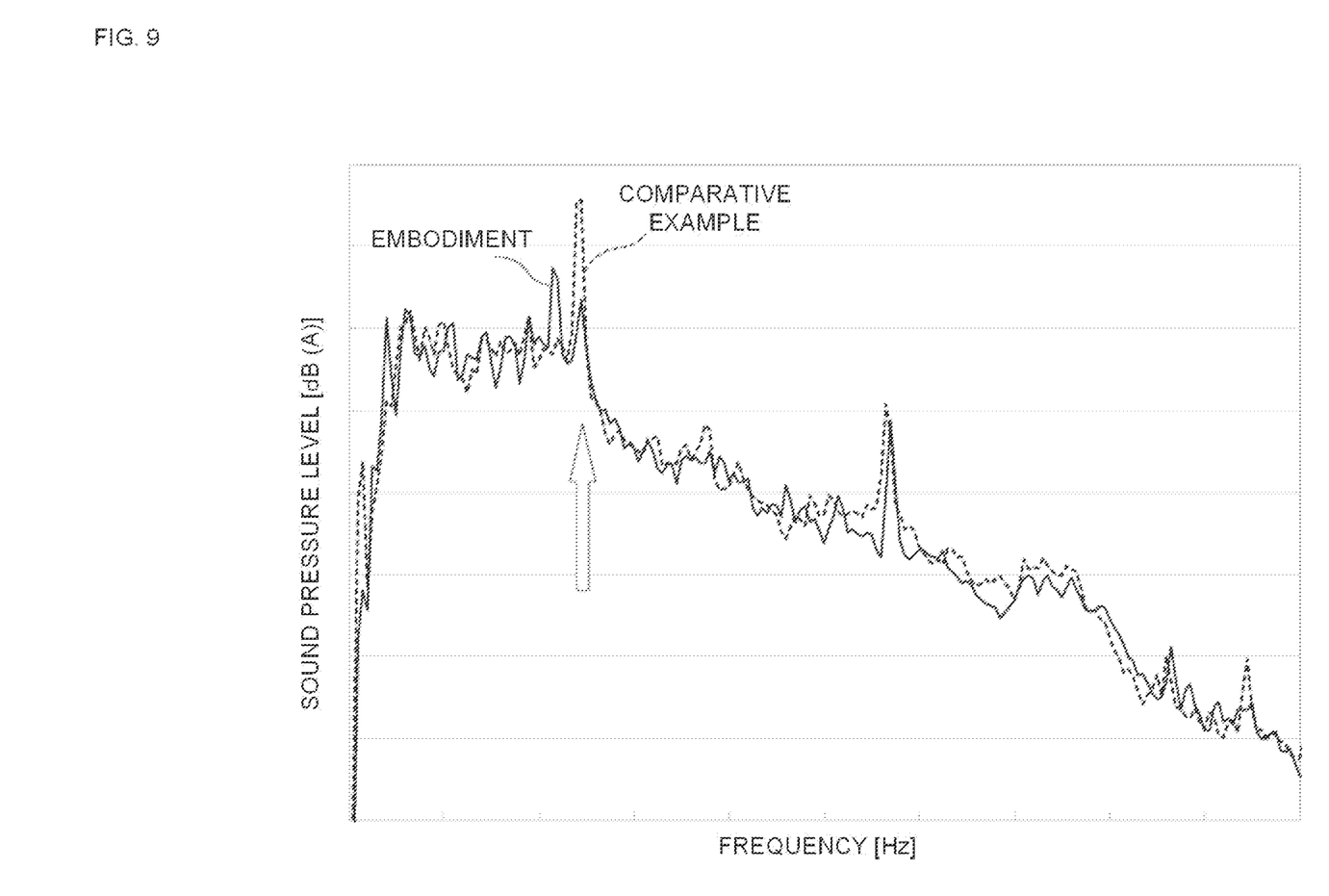
FIG. 9 is a graph showing difference in sound pressure level due to difference in centrifugal fan shape.

A result of measurement is shown in FIG. 9. FIG. 9 shows a difference in sound pressure levels due to different shapes of centrifugal fans.

As indicated by an arrow in FIG. 9, compared to the blower in the comparative example, noise peak in a primary component of fan rotation or the like is reduced in the blower in the embodiment.

What is claimed is:

1. A blower, comprising:
a blower main body having a front side, a rear side, a left side, a right side, a top side, and a bottom side, the left and right sides having first and second ventilation portions, respectively;
a centrifugal fan provided at an inner space of the blower main body; and
a motor fixed to the centrifugal fan, a frame of the motor being positioned at an inside of the centrifugal fan between a right edge and a left edge of the centrifugal fan when viewed along a first direction facing the top side of the blower main body,
wherein the centrifugal fan includes a support plate having a rotation axis, and the support plate has first and second surfaces outwardly opposite to each other,
the centrifugal fan includes a plurality of first blades and a plurality of second blades provided on the first surface and the second surface of the support plate, respectively, and
a position of at least part of the plurality of first blades and a position of at least part of the plurality of second blades are misaligned in a circumferential direction, and/or a number of the plurality of first blades differs from a number of the plurality of second blades.

2. The blower according to claim 1,
wherein one of the plurality of first blades is positioned at a location corresponding to a center between adjacent blades of the plurality of second blades.

3. The blower according to claim 2, further comprising:
a handle provided at the top side of the blower main body; and
a blower pipe fixed to the front side of the blower main body,
wherein the motor and the handle are positioned between a first line and a second line when viewed along the first direction, and
the first and second lines extend from a right outermost periphery and a left outermost periphery of the blower pipe, respectively, when viewed along the first direction.

4. The blower according to claim 2,
wherein the centrifugal fan has a recess at an area adjacent to the rotation axis around which the centrifugal fan rotates, and
the frame of the motor is housed in the recess of the centrifugal fan.

5. The blower according to claim 1,
wherein the centrifugal fan includes a location where a distance between adjacent blades of at least one of the plurality of first blades or the plurality of second blades differs in the circumferential direction.

6. The blower according to claim 5,
wherein the distance between the adjacent blades is progressively decreasing or increasing along the circumferential direction.

7. The blower according to claim 6, further comprising:
a handle provided at the top side of the blower main body; and
a blower pipe fixed to the front side of the blower main body,
wherein the motor and the handle are positioned between a first line and a second line when viewed along the first direction, and the first and second lines extend from a right outermost periphery and a left outermost periphery of the blower pipe, respectively, when viewed along the first direction.

8. The blower according to claim 6,
wherein the centrifugal fan has a recess at an area adjacent to the rotation axis around which the centrifugal fan rotates, and
the frame of the motor is housed in the recess of the centrifugal fan.

9. The blower according to claim 5, further comprising:
a handle provided at the top side of the blower main body; and
a blower pipe fixed to the front side of the blower main body,
wherein the motor and the handle are positioned between a first line and a second line when viewed along the first direction, and
the first and second lines extend from a right outermost periphery and a left outermost periphery of the blower pipe, respectively, when viewed along the first direction.

10. The blower according to claim 5,
wherein the centrifugal fan has a recess at an area adjacent to the rotation axis around which the centrifugal fan rotates, and
the frame of the motor is housed in the recess of the centrifugal fan.

11. The blower according to claim 1,
wherein a maximum height of the plurality of first blades is approximately equal to a maximum height of the plurality of second blades.

12. The blower according to claim 11, further comprising:
a handle provided at the top side of the blower main body; and
a blower pipe fixed to the front side of the blower main body,
wherein the motor and the handle are positioned between a first line and a second line when viewed along the first direction, and
the first and second lines extend from a right outermost periphery and a left outermost periphery of the blower pipe, respectively, when viewed along the first direction.

13. The blower according to claim 11,
wherein the centrifugal fan has a recess at an area adjacent to the rotation axis around which the centrifugal fan rotates, and
the frame of the motor is housed in the recess of the centrifugal fan.

14. The blower according to claim 1,
wherein the centrifugal fan is an integral object of the support plate, the plurality of first blades, and the plurality of second blades.

15. The blower according to claim 14, further comprising:
a handle provided at the top side of the blower main body; and
a blower pipe fixed to the front side of the blower main body,
wherein the motor and the handle are positioned between a first line and a second line when viewed along the first direction, and
the first and second lines extend from a right outermost periphery and a left outermost periphery of the blower pipe, respectively, when viewed along the first direction.

16. The blower according to claim 1, further comprising:
a blower pipe fixed to the front side of the blower main body,
wherein the support plate is aligned on a line extending from a central axis of the blower pipe when viewed along the first direction.

17. The blower according to claim 1,
wherein the first ventilation portion has a plurality of first through holes, and the second ventilation portion has a plurality of second through holes, and
a first sum of opening areas of the plurality of first through holes is approximately equal to a second sum of opening areas of the plurality of second through holes.

18. The blower according to claim 17,
wherein a shape of the first ventilation portion is substantially equal to a shape of the second ventilation portion.

19. The blower according to claim 1, further comprising:
a handle provided at the top side of the blower main body; and
a blower pipe fixed to the front side of the blower main body,
wherein the motor and the handle are positioned between a first line and a second line when viewed along the first direction, and
the first and second lines extend from a right outermost periphery and a left outermost periphery of the blower pipe, respectively, when viewed along the first direction.

20. The blower according to claim 1,
wherein the centrifugal fan has a recess at an area adjacent to the rotation axis around which the centrifugal fan rotates, and
the frame of the motor is housed in the recess of the centrifugal fan.

* * * * *